United States Patent [19]
Lambourg

[11] Patent Number: 6,052,576
[45] Date of Patent: Apr. 18, 2000

[54] RADIOCOMMUNICATIONS EQUIPMENT WITH A SECURITY CALLS MODE, AND EXTENSION UNIT FORMING PART OF SUCH EQUIPMENT

[75] Inventor: Michel Claude Lambourg, Chaville, France

[73] Assignee: Matra Communication, France

[21] Appl. No.: 08/888,697

[22] Filed: Jul. 7, 1997

[30] Foreign Application Priority Data

Jul. 9, 1996 [FR] France .................................... 96 08514

[51] Int. Cl.[7] ...................................................... H04K 1/00
[52] U.S. Cl. ............................. 455/410; 455/411; 455/88
[58] Field of Search ........................... 455/90, 410, 411, 455/557, 568, 575, 88; 380/48, 49, 2, 21–25

[56] References Cited

U.S. PATENT DOCUMENTS

| | | | |
|---|---|---|---|
| 5,077,791 | 12/1991 | Salihi ........................................ | 380/23 |
| 5,524,134 | 6/1996 | Gustafson et al. ........................ | 379/58 |
| 5,703,950 | 12/1997 | Jovanovich et al. ..................... | 380/23 |
| 5,715,522 | 2/1998 | Vimpari et al. ........................... | 455/88 |

FOREIGN PATENT DOCUMENTS

| | | |
|---|---|---|
| 0 617 528 | 9/1994 | European Pat. Off. . |
| 0 720 304 | 7/1996 | European Pat. Off. . |
| WO90/09065 | 8/1990 | WIPO . |

OTHER PUBLICATIONS

Cooke et al. "The use of smart cards in personal communication systems security", Proc. of the Conference on Telecommunications, Manchester, Apr. 18, 1993, pp. 246–251.

Primary Examiner—Daniel S. Hunter
Assistant Examiner—Pablo N. Tran
Attorney, Agent, or Firm—Kilpatrick Stockton LLP

[57] ABSTRACT

The equipment comprises a radio terminal adapted to calls with a public mobile telephony network supporting voice transmission channels and data channels, and an extension unit which can be connected to a data interface of the terminal and allowing calls on the data channels of the network. This extension unit comprises a microphone, an earphone, a vocoder and a ciphering module. It has the same external appearance as a conventional mobile radio terminal. In a security call mode, the signal coming from the microphone of the extension unit is processed by the vocoder and then by the ciphering module in order to produce data sent to the data interface of the terminal, and the data received from the data interface of the terminal are processed by the ciphering module and by the vocoder in order to control the earphone of the extension unit.

10 Claims, 1 Drawing Sheet

RADIOCOMMUNICATIONS EQUIPMENT WITH A SECURITY CALLS MODE, AND EXTENSION UNIT FORMING PART OF SUCH EQUIPMENT

BACKGROUND OF THE INVENTION

The present invention relates to a mobile radiocommunications equipment offering its user the possibility of having confidential calls with his correspondent.

"Confidential call" is here understood to be a call in which the voice transmission signals exchanged are ciphered using a method and/or ciphering keys which are known only to the correspondents or to an organisation grouping those correspondents.

The present invention is particularly intended to allow such confidential calls in large geographic zones.

The present surge in public cellular radiotelephony networks offers an attractive possibility because of the numerous existing base stations which provide a very large territorial cover.

Certain of the cellular networks allow the ciphering of voice transmission calls. This is the case in particular of the European GSM system and its derivatives. However, the cipherings carried out generally ensure the confidentiality of the call only on the air interface. Even in the case of a GSM call between two mobile terminals, the voice transmission signals are deciphered and transcribed (from 13 to 64 kbits/s) for the links between various entities of the infrastructure on the ground. The security of calls is not therefore complete. Furthermore, the ciphering functions are under the control of the network operator and not of the users, which is not satisfactory for providing confidentiality in the above sense.

An object of the present invention is to propose a radiocommunications equipment which is suitable for confidential calls by means of the existing structure of a public mobile telephony network. It is also desired that the equipment should be discreet in its use and that it should furthermore be of moderate cost price.

SUMMARY OF THE INVENTION

The invention thus proposes a radiocommunications equipment comprising a radio terminal adapted to calls with a public mobile telephony network supporting voice transmission channels and data channels, the radio terminal comprising a data interface for the connection of a data input/output unit allowing calls on the data channels of the network. According to the invention, the equipment further comprises, as a data input/output unit, an extension unit having an external appearance similar to that of a radiocommunications terminal and comprising at least a microphone, an earphone, a vocoder and a ciphering module. In a security call mode, the vocoder forms, from the signal coming from the microphone, a binary flow which the ciphering module processes in order to produce data sent to the data interface for transmission on a data channel, and data presented at the data interface after reception on a data channel are deciphered by the ciphering module in order to produce a binary flow which the vocoder decodes in order to control the earphone. Another aspect of the invention relates more particularly to the extension unit of this equipment.

The invention thus exploits the presence of data channels in certain radiotelephony networks. The confidential calls use these data channels in a transparent manner. The data thus exchanged represent voice transmission signals and are ciphered and deciphered at each of the ends of the call. A third party monitoring the path of the call without knowing the coding method, the ciphering method and the ciphering keys used has no access to the voice transmission signals.

The functions necessary for the security calls mode are grouped in an extension unit of a existing radio terminal. This avoids having to design, for this specific application, the whole of a radio terminal compatible with the public network. This results in a significant limitation in the cost price of the equipment. The economic advantage is further enhanced by the use of an ordinary radio terminal benefitting from the mass effect brought about by the development of digital cellular networks such as the GSM.

Another advantage of the equipment according to the invention is its discretion. The radio terminal used can be carried discreetly by the user, for example in an item of clothing, and connected for example by a cable to the extension unit held in the hand. As the latter unit has the external appearance of a radiocommunications terminal, an observer will have the impression that it is an ordinary radio call and not particularly confidential.

DESCRIPTION OF A PREFERRED EMBODIMENT

Figure 1:
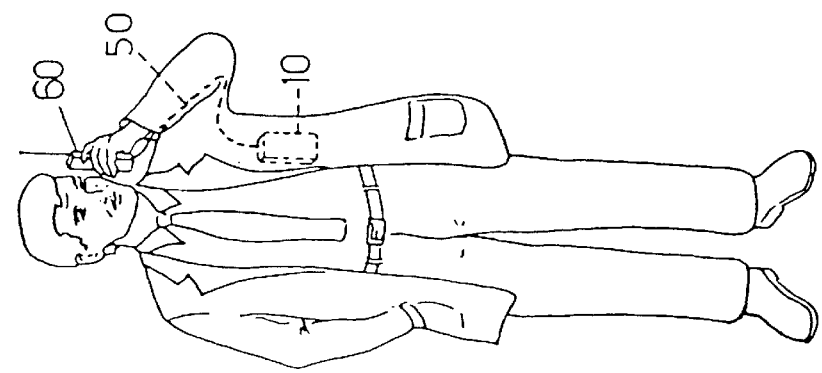
FIG. 1 shows a radiocommunications equipment according to the invention in the process of being used.

FIG. 1 shows a person using a radiocommunications equipment according to the invention, namely a radio terminal 10, an extension unit 60 and a connecting cable 50. The assembly is carried in a discreet manner by the user, that is to say the terminal 10 can be placed in the pocket of an item of clothing and the extension unit 60 can be held in the hand, the cable 50 passing, for example, through a sleeve of the item of clothing so that it is invisible.

Figure 3:
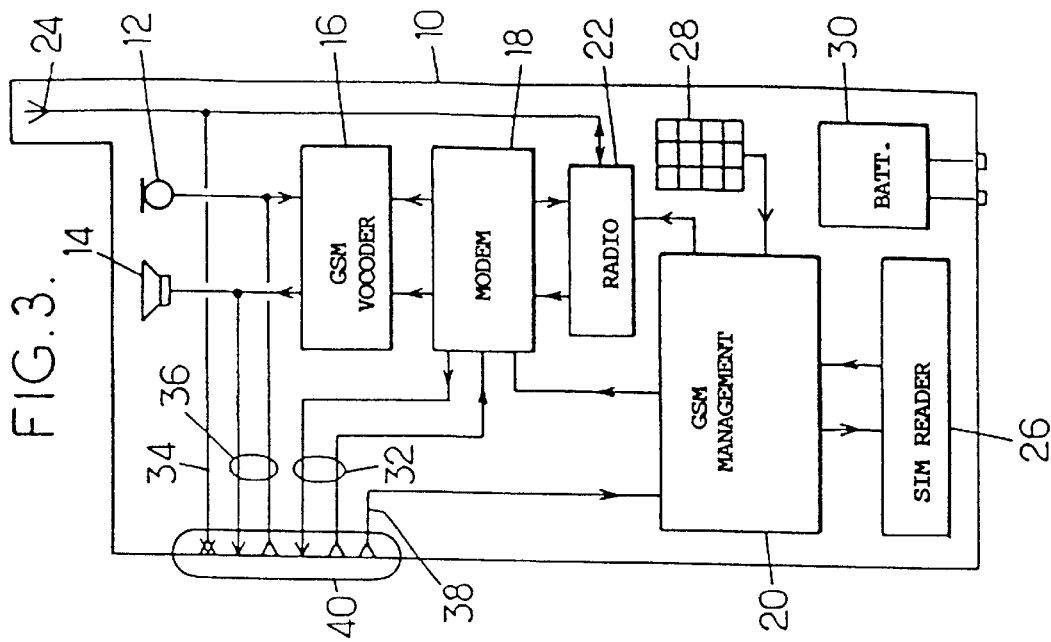
FIGS. 2 and 3 are respectively block diagrams of an extension unit and of a radio terminal forming part of the equipment according to the invention.
Figure 2:
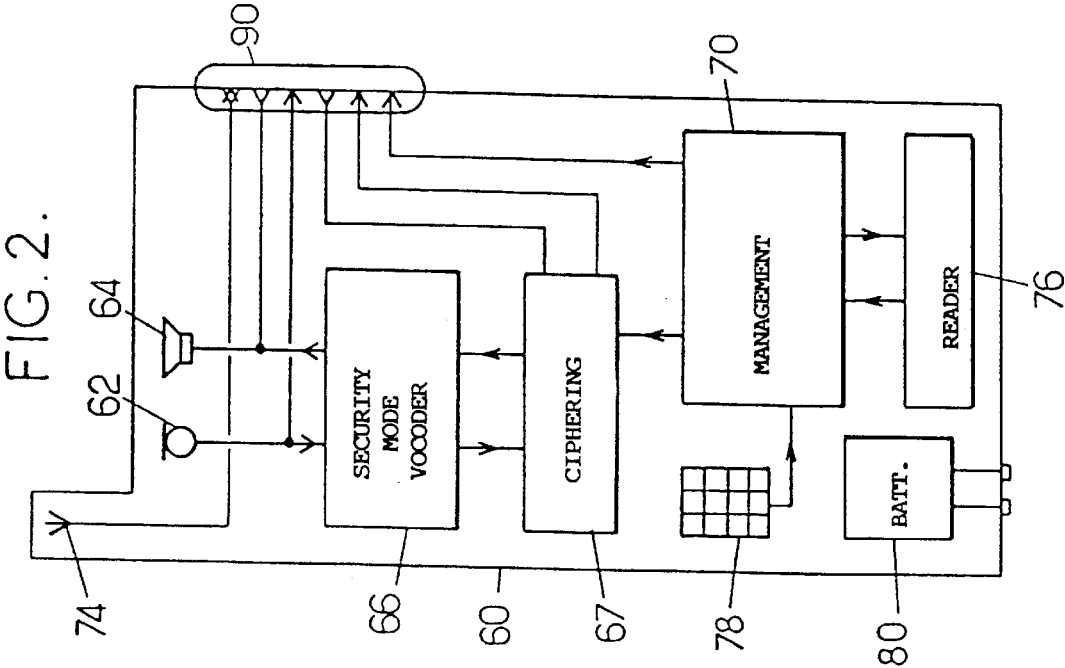

The radio terminal 10, a block diagram of which is shown in FIG. 3, is an ordinary terminal compatible with a public radiotelephony network. In the rest of the description, the case of a GSM network will be considered, without this being limitative.

The specifications of GSM terminals are well known to those skilled in the art. The terminal 10 thus comprises:

- a microphone 12 and an earphone 14,
- a vocoder 16 (of the RPE-LTP type) in accordance with the GSM standards,
- a modulator/demodulator 18 providing the functions of channel coding/decoding and of formation of TDMA (Time Division Multiple Access) frame under the control of a management module 20,
- a radio stage 22 connecting the interface with the antenna 24 of the terminal,
- a reader 26 for a removable data medium or SIM (Subscriber Identity Module) card, in which are stored the user's subscription data to allow the management module 20 to execute the authentication and call management tasks provided by the GSM standards,
- a keyboard 28 for dialling the numbers of correspondents or for calling up other functions,
- a rechargeable battery 30 for supplying electrical power to the various modules of the terminal.

The terminal 10 is further provided with a certain number of external interfaces grouped in a single connector 40 to which is connected the connecting cable 50. These interfaces comprise:

a data interface 32 for connecting an external data input/output unit. The interface 32 is connected to the modulator/demodulator 18 in order to supply it with data to transmit in a data channel of the radio network and in order to transmit to the data input/output unit data which is demodulated after reception on a data channel of the radio network. In most known applications, the data input/output unit is generally a micro-computer or a fax machine;

an antenna interface 34 for connecting a remote antenna. Such an interface is often provided for uses of the terminal in a car, in order to allow the radio stage 22 to use the vehicle's antenna;

an audio interface 36 allowing the vocoder 16 to receive its audio signals from a remote microphone instead of from the microphone 12 and to send the audio signals to a loudspeaker or a remote earphone rather than to the earphone 14. Such an interface 36 is frequently provided for connecting a hand-free device to the terminal;

a control interface 38 for connecting an external keyboard instead of the keyboard 28 for dialling or for entering other commands (most often the external keyboard is that of the microcomputer or of the fax machine connected to the data interface 32).

An example of a GSM terminal 10 grouping the above interfaces in a same connector 40 is the MATRACOM 2050 terminal marketed by the applicant.

The invention proposes coupling such a radio terminal with an extension unit 60 having the external appearance of a radiotelephony terminal and provided with a connector 90, which is complementary to the connector 40, for connecting the connecting cable 50.

The extension unit 60 comprises a microphone 62 and an earphone 64, a vocoder 66 which is specific to a security call mode, and a ciphering module 67. The ciphering module 67 is connected to the data interface 32 of the terminal 10 through the connector 90 and the connecting cable 50.

In the security call mode, the extension unit 60, more precisely the ciphering module 67, constitutes the data input/output unit coupled with the interface 32 of the terminal 10. The voice transmission signals received from the microphone 62 are coded by the vocoder 66 and then ciphered by the module 67 which thus produces data sent to the data interface 32. In the other direction, the data received from the interface 32 are deciphered by the module 67, then decoded by the vocoder 66, the audio signal thus reconstituted being applied to the earphone 64.

The ciphered voice transmission calls thus use the data channels of the cellular network. In the case of GSM networks, 9600 bits/s data channels are provided (see GSM 02.02 Recommendation), which is a data rate greatly sufficient for a large number of known vocoders. The user's correspondent can be provided with an equipment of the same type or with a fixed data transmission/reception equipment capable of deciphering the transmitted messages.

The operation of the extension unit 60 is supervised by a management module 70 which cooperates with a reader 76 of a removable data medium. This medium is for example a smart card entrusted to the user and able to contain data of the same type as the SIM modules of the GSM, and able to exhibit the same interface characteristics. But these data concern the user in relation to his organisation or his correspondents and not in relation to the operator of the public network (the SIM module of the GSM must be presented to the reader 28 of the GSM terminal 10 for this). The management module 70 provides, in particular, the authentication and/or identification procedures between the user and his correspondent according to a pre-established protocol and by exchanging corresponding data with the removable medium presented to the reader 76. The management module 70 further defines, according to these protocols, the ciphering key or keys required by the module 67.

The extension unit 60 advantageously comprises an antenna 74 which is connected to the antenna interface 34 through the connector 90 and the cable 50 in order to constitute a remote antenna of the terminal 10.

The microphone 62 and the earphone 64 of the extension unit 60 can also be connected to the audio interface 36 through the connector 90 and the connecting cable 50 in order to form a remote microphone and a remote earphone with respect to the vocoder 16 of the radio terminal 10. The user can then use the extension unit 60 both for security mode calls (via the vocoder 66, the ciphering module 67 and a data channel) and for when he selects a non-security call mode (by means of the vocoder 16 and of a voice transmission channel of the network).

The management module 70 is connected to another user interface consisting of a keyboard 78 allowing the user to dial the numbers of his correspondents (the keyboard 78 being connected as an external keyboard to the control interface 38 through the management module 70), to select the call mode (security or non-security), and possibly to command other functions. The extension unit 60 can also comprise a display screen, not shown.

Finally, the extension unit 60 comprises a rechargeable battery 80 for supplying electrical power to its various components.

What is claimed is:

1. Radiocommunications equipment, comprising a radio terminal capable of communicating through a public mobile telephone network supporting voice transmission channels and data channels, and an extension unit having an external appearance similar to that of a radiocommunications terminal, wherein the radio terminal comprises a data interface for connecting a data input/output unit for communicating on the data channels of the network, wherein the extension unit is connected to the data interface as said data input/output unit, wherein the extension unit comprises at least a microphone, an earphone, a vocoder and a ciphering module, the equipment having a security call mode wherein the vocoder forms, from a signal input by the microphone, a binary stream processed by the ciphering module in order to produce data sent to the data interface for transmission on a data channel, and data presented at the data interface upon reception on a data channel are deciphered by the ciphering module in order to produce a binary stream decoded by the vocoder in order to drive the earphone.

2. Equipment according to claim 1, wherein the radio terminal comprises an antenna interface for connecting a remote antenna for transmitting and receiving radio waves, and wherein the extension unit comprises an antenna connected to the antenna interface as said remote antenna.

3. Equipment according to claim 1, wherein the radio terminal comprises a second vocoder adapted to voice transmission channels of the public mobile telephone network, and an audio interface for connecting a remote microphone and a remote earphone to said second vocoder, and wherein the microphone and the earphone of the extension unit are connected to the audio interface so as to provide said remote microphone and the remote earphone, respectively, in a non-security call mode.

4. Equipment according to claim 1, wherein the radio terminal comprises a control interface for connecting an external keyboard for dialing, and wherein the extension unit further comprises a keyboard connected to the control interface as said external keyboard.

5. Equipment according to claim 1, wherein the extension unit further comprises a management module for controlling at least the security call mode, and a removable data medium reader for exchanging authentication and/or identification data between the management module and a data medium presented to said reader.

6. Extension unit for a radio terminal capable of communicating through a public mobile telephone network supporting voice transmission channels and data channels, the radio terminal comprising a data interface for connecting a data input/output unit for communicating on the data channels of the network, the extension unit being arranged to be connected to the radio terminal as said data input/output unit, wherein the extension unit has an external appearance similar to that of a radiocommunications terminal, wherein the extension unit comprises at least a microphone, an earphone, a vocoder and a ciphering module, and wherein, in a security call mode, the vocoder forms, from a signal coming from the microphone, a binary stream processed by the ciphering module in order to produce data sent to the data interface for transmission on a data channel, and data presented at the data interface upon reception on a data channel are deciphered by the ciphering module in order to produce a binary stream decoded by the vocoder in order to drive the earphone.

7. Extension unit according to claim 6, for a radio terminal comprising an antenna interface for connecting a remote antenna for transmitting and receiving radio waves, the extension unit comprising an antenna to be connected to the antenna interface as said remote antenna.

8. Extension unit according to claim 6, for a radio terminal comprising a second vocoder adapted to voice transmission channels of the public mobile telephone network and an audio interface for connecting a remote microphone and a remote earphone to said second vocoder, wherein the microphone and the earphone of the extension unit are to be connected to the audio interface so as to provide said remote microphone and said remote earphone, respectively, in a non-security call mode.

9. Extension unit according to claim 6, for a radio terminal comprising a control interface for connecting an external keyboard for dialing, the extension unit comprising a keyboard to be connected to the control interface as said external keyboard.

10. Extension unit according to claim 6, further comprising a management module for controlling at least the security call mode, and a removable data medium reader for exchanging authentication and/or identification data between the management module and a data medium presented to said reader.

* * * * *